United States Patent [19]
Kobayashi et al.

[11] Patent Number: 5,548,799
[45] Date of Patent: Aug. 20, 1996

[54] MOBILE COMMUNICATION SYSTEM HAVING A CONTROL FOR LIMITING THE NUMBER OF CARRIERS BASED ON THE LEVEL OF INTERMODULATION DISTORTION

[75] Inventors: Fumihiko Kobayashi; Junichi Hasegawa, both of Kawasaki, Japan

[73] Assignee: Fujitsu Limited, Kawasaki, Japan

[21] Appl. No.: 186,334

[22] Filed: Jan. 25, 1994

[30] Foreign Application Priority Data

Aug. 2, 1993 [JP] Japan ..................... 5-191018

[51] Int. Cl.$^6$ ............... H04B 1/60; H04B 17/00; H04B 17/02; H03C 1/62
[52] U.S. Cl. ................. 455/8; 455/9; 455/67.1; 455/115
[58] Field of Search ........... 379/58, 59; 455/8, 455/9, 67.1, 67.7, 103, 115, 126, 127; 330/124 D; 395/182.12; 340/825.16

[56] References Cited

U.S. PATENT DOCUMENTS

| | | | |
|---|---|---|---|
| 5,119,040 | 6/1992 | Long et al. ................. | 330/149 |
| 5,187,803 | 2/1993 | Sohner et al. ................. | 455/4.1 |
| 5,394,120 | 2/1995 | Sakamoto et al. .............. | 330/2 |
| 5,412,342 | 5/1995 | Sakamoto et al. .............. | 330/149 |
| 5,424,864 | 6/1995 | Emura ..................... | 359/173 |
| 5,425,049 | 5/1995 | Dent ....................... | 375/202 |

*Primary Examiner*—Edward L. Coles, Sr.
*Assistant Examiner*—Kimberly A. Williams
*Attorney, Agent, or Firm*—Armstrong, Westerman, Hattori, McLeland & Naughton

[57] ABSTRACT

A member communication system which includes a radio base station connected to an exchange for establishing a communication interface with a mobile terminal such as a car telephone set where the number of output carriers of a modulation apparatus to be inputted to an amplification apparatus is controlled so as to be decreased in response to failure of an amplification circuit or circuits so that an increase in intermodulation distortion is eliminated and the necessity for each amplification circuit to have a superfluous saturation output is eliminated, thereby reducing power consumption. In the mobile communication system, the radio base station includes a modulation apparatus including a plurality of modulation circuits for outputting carriers different from each other, an amplification apparatus including a plurality of amplification circuits connected in parallel to each other, failure supervision apparatus for supervising a failed condition of the amplification circuits of the amplification apparatus, and an output carrier number control apparatus, for controlling the number of output carriers of the modulation apparatus in response to amplification circuit failure information detected by the failure supervision apparatus.

6 Claims, 9 Drawing Sheets

MOBILE COMMUNICATION SYSTEM HAVING A CONTROL FOR LIMITING THE NUMBER OF CARRIERS BASED ON THE LEVEL OF INTERMODULATION DISTORTION

BACKGROUND OF THE INVENTION

1. Field of the Invention

This invention relates to a mobile communication system which includes a radio base station connected to an exchange to establish a communication interface with a mobile terminal such as a car telephone set.

2. Description of the Related Art

In recent years, as the employment of digital processing in car telephone systems proceeds, amplification apparatus of the type wherein a plurality of RF (radio frequency) carriers are commonly amplified are progressively employed as amplification apparatus installed in a radio base station. Where an amplification apparatus of the type mentioned is employed, a saturation output which satisfies intermodulation distortion and spurious standards is required, and the power consumption of the amplification apparatus is very high. Therefore, power consumption must necessarily be reduced.

FIG. 7 shows a mobile communication system, and FIG. 9 illustrates communications in the mobile communication system shown in FIG. 7. Referring to FIGS. 7 and 9, an exchange 21 accommodates a plurality of radio base stations 23.

A mobile terminal 22 as represented by a car telephone set is accommodated in one of the radio base stations 23 by way of which optimum communications are available with the mobile terminal 22.

The radio base station 23 establishes a communication interface between the exchange 21 and the mobile terminal 22. In particular, the radio base station 23 has three pairs of transmission antennae 37-1, 37-2 and 37-3 and reception antennae 37-4, 37-5 and 37-6 and performs communications with the mobile terminal 22 in accordance with the space diversity system. To this end, the radio base station 23 includes a modulation and demodulation apparatus (modem) 24, an amplification apparatus 25, and a transmission apparatus 39 having a multiplexing function and a demultiplexing function.

The modulation and demodulation apparatus 24 modulates and sends a transmission signal to the amplification apparatus 25 and demodulates a reception signal from the amplification apparatus 25. The modulation and demodulation apparatus 24 includes three modulation and demodulation apparatus 24a-1, 24a-2 and 24a-3 and a base band interface section 32. The modulation and demodulation apparatus 24a-1, 24a-2 and 24a-3 are individually provided for three units called sectors into which the area of directions of transmission and reception around the radio base station 23 is divided, thereby forming a three-sector configuration. Each of the modulation and demodulation apparatus 24a-1, 24a-2 and 24a-3 includes a distribution and composition section 33a, and modulation and demodulation circuits 34-1 to 34-n (n is an integral number equal to or greater than 2) provided for each one Carrier.

The distribution and composition section 33a performs composition of a transmission signal and distribution of a reception signal. Meanwhile, each of the modulation and demodulation circuits 34-i (i=1 to n) performs modulation or demodulation of a carrier frequency. Accordingly, where n modulation and demodulation circuits are involved, n carrier frequencies can be modulated or demodulated.

The amplification apparatus 25 amplifies a transmission or reception signal to a signal of a prescribed power and includes three amplification apparatus 25a-1, 25a-2 and 25a-3 individually provided for the sectors. Each of the amplification apparatus 25a-1, 25a-2 and 25a-3 includes a transmission and reception unit 38, a transmission amplification section 25b and a pair of reception amplification circuits 75a and 75b.

FIG. 8 shows details of the amplification apparatus 25a-1 as a representative of the amplification apparatus 25a-1, 25a-2 and 25a-3. Referring to FIG. 8, the transmission amplification section 25b of the amplification apparatus 25a-1 includes an input distributor 36, four amplification circuits 35-1 to 35-4 and a power composer 33.

The input distributor 36 divides a transmission signal into four divisional signals and sends the divisional signals to the amplification circuits 35-1 to 35-4. The amplification circuits 35-1 to 35-4 are connected in parallel with each other and amplify the respective divisional transmission signals to signals of a predetermined power. The power composer 33 composes the divisional transmission signals back into a transmission signal. The transmission and reception unit 38 suppresses unnecessary frequencies of a transmission or reception signal outside a predetermined frequency band.

The amplification apparatus 25a-1 further includes a supervision control item interface circuit 76 which supervises a failure condition of the amplification circuits 35-1 to 35-4. The amplification apparatus 25a-1 further includes a reception filter 78.

Referring back to FIG. 7, the exchange 21 includes a pair of transmission apparatus 41 and 43 each having a multiplexing function and a demultiplexing function, an exchange apparatus 42, an exchange control apparatus 44 and a base station control apparatus 77.

The exchange apparatus 42 performs switching of circuits, and the exchange control apparatus 44 controls the exchange apparatus 42. The base station control apparatus 77 performs remote control of the various components in the radio base station 23.

The exchange 21 and each of the radio base stations 23 are connected to each other by way of a transmission line 45.

In the mobile communication system of the construction described above, each of the radio base stations 23 connected to the exchange 21 establishes a communication interface with a mobile terminal 22. In particular, if it is assumed that a mobile terminal 22 as represented by a car telephone set is accommodated in a radio base station 23 by way of which optimum communications are available with the mobile terminal 22 at present, then the radio base station 23 performs communications with the mobile terminal 22 in accordance with the space diversity system as it includes the three pairs Of transmission antennae 37-1 to 37-3 and reception antennae 37-4 to 37-6.

In the radio base station 23, since the modulation and demodulation apparatus 24 and the amplification apparatus 25 are provided for the individual sectors so as to have a three-sector configuration a transmission signal flows in the following manner for each sector.

In particular, a signal transferred from the exchange 21 to the radio base station 23 is sent to the modulation and demodulation apparatus 24 by way of the transmission apparatus 39. In the modulation and demodulation apparatus 24, the signal is transmitted by way of the base band interface section 32 to and divided by the modulation and demodulation circuits 34-1 to 34-n into n RF modulation waves (n multi-carriers). The carries are composed by the distribution and composition section 33a and then sent to the amplification apparatus 25. It is to be noted that the base station control apparatus 77 of the exchange 21 controls the number of carriers in response to a variation of the traffic (number of calls).

In the transmission amplification section 25b in the amplification apparatus 25a-1, the transmission signal is divided into four divisional transmission signals by the input distributor 36, and the divisional transmission signals are amplified to signals of a prescribed power by the four amplification circuits 35-1 to 35-4 and then composed by the power composer 33.

The thus composed amplified signal from the amplification apparatus 25a-1 is sent to the transmission and reception unit 38, in which unnecessary frequencies outside a predetermined frequency band are suppressed. Thereafter, the signal from the transmission and reception unit 38 is transmitted from the transmission antenna 37-1.

It is to be noted that the reason why the present system includes the parallel configuration of the amplification circuits 35-1 to 35-4 is that it employs a redundancy construction because it does not include a reserve system from the point of view of minimization and reduction of the power consumption.

Further, an RF switch is provided at an end of each of branches of the input distributor 36 and the power composer 33 so that the number of parallel connected ones of the amplification circuits 35-1 to 35-4 may be variable and a possible gain variation at the transmission amplification section 25b may not be caused upon such variation of the number.

In this manner, even if one of the amplification circuits 35-1 to 35-4, for example, the amplification circuit 35-1, fails, a variation of the output of the amplification apparatus 25a-1 is prevented. However, if the amplification circuit 35-1 fails in this manner and is disconnected from the system, then the output operation points of the other amplification circuits 35-2, 35-3 and 35-4 rise. It is to be noted that failure information of the amplification circuits 35-1 to 35-4 is collected by the supervision control item interface circuit 76.

Further, in the exchange 21, the exchange apparatus 42 performs switching of circuits under the control of the exchange control apparatus 44, and the base station control apparatus 77 performs remote control of the components in the radio base station 23.

In such a mobile communication system as described above, however, when some of a plurality of amplification circuits fail, the output operation points of the other amplification circuits rise so that the output of the apparatus may not vary. Consequently, the mobile communication system suffers from increased intermodulation distortion of the output of the apparatus. Further, in order to satisfy the intermodulation standard, an amplification circuit having a higher saturation output is required. Consequently, the mobile communication system suffers from increased power consumption by such amplification circuit.

SUMMARY OF THE INVENTION

It is an object of the present invention to provide a mobile communication system which eliminates possible high levels of intermodulation distortion and prevents each amplification circuit from having a superfluous saturation output thereby to reduce the power consumption.

In order to attain the object described above, according to the present invention, there is provided a mobile communication system, which comprises an exchange, a radio base station connected to the exchange for establishing a communication interface with a mobile terminal, the radio base station including a modulation apparatus including a plurality of modulation circuits for outputting carries different from each other, an amplification apparatus including a plurality of amplification circuits connected in parallel to each other, and failure supervision means for supervising a failed condition of the amplification circuits of the amplification apparatus, and output carrier number control means for controlling the number of output carriers of the modulation apparatus in response to amplification circuit failure information detected by the failure supervision means.

The output carrier number control means may include failed amplification circuit number detection means for detecting the number of failed ones of the amplification circuits, upper limit carrier number determination means for determining the upper limit number of carriers from the failed amplification circuit number detected by the failed amplification circuit number detection means, and modulation circuit stopping instruction means for outputting a stopping instruction to a required number of ones of the modulation circuits so that the number of effective ones of the modulation circuits may not exceed the upper limit carrier number determined by the upper limit carrier number determination means. Preferably, the upper limit carrier number determined by the upper limit carrier number determination means is determined in response to three-dimensional intermodulation distortion information. The upper limit carrier number determination means may include storage means for storing a carrier number-three-dimensional intermodulation distortion information characteristic.

The output carrier number control means may be provided in the exchange or alternatively in the radio base station.

Output carrier number control information from the output carrier number control means may Be transmitted to the exchange in which the output carrier number control information is managed.

Accordingly, with the mobile communication system, possible increases in three-dimensional intermodulation distortion is eliminated by controlling the number of output carriers of the modulation apparatus to be inputted to the amplification apparatus so as to be decreased in response to failure of the amplification circuits, and this eliminates the necessity for each amplification circuit to have a surplus saturation output. Consequently, the mobile communication system is advantageous in that the power consumption can be significantly reduced.

Further objects, features and advantages of the present invention will become apparent from the following detailed description when read in conjunction with the accompanying drawings in which like parts or elements are denoted by like reference characters.

DESCRIPTION OF THE PREFERRED EMBODIMENTS a. Aspect of the Present Invention

Figure 1:
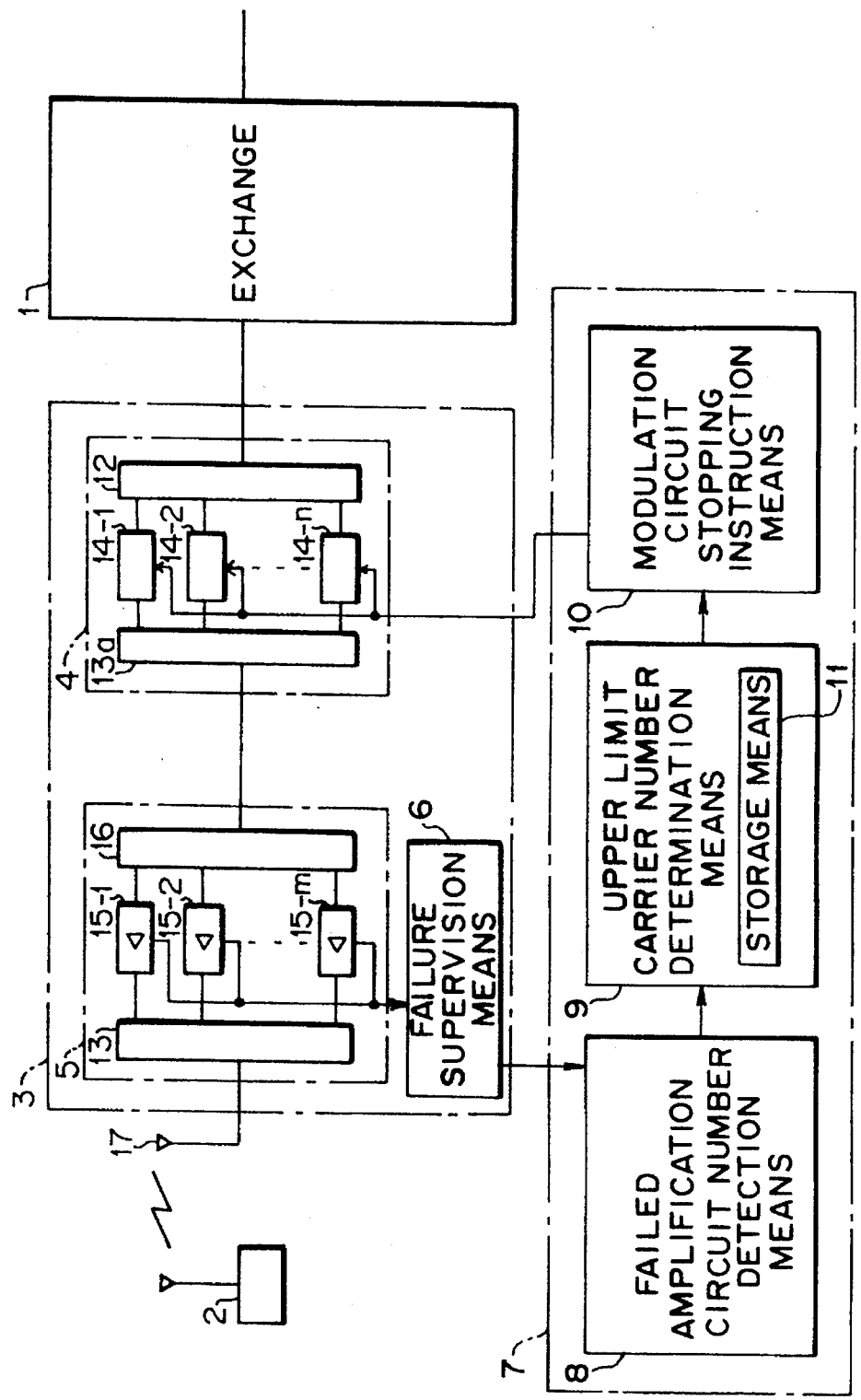
FIG. 1 is a block diagram of a mobile communication system illustrating one aspect of the present invention.

Referring first to FIG. 1, there is shown a mobile communication system according to one aspect of the present invention. The mobile communication system includes an exchange 1 which accommodates a radio base station 3. The radio base station 3 establishes a communication interface with a mobile terminal 2 and includes a modulation apparatus 4, an amplification apparatus 5, failure supervision means 6 and an antenna 17.

The modulation apparatus 4 modulates a signal and sends the modulated signal to the amplification apparatus 5 and includes a base band interface section 12, n modulation circuits 14-1 to 14-n (n is an integral number equal to or greater than 2), and a power composer 13a.

Here, the modulation circuits 14-i (i=1 to n) output carriers different from one another. The power composer 13a composes signals and sends out the thus composed signal to the amplification apparatus 5.

The amplification apparatus 5 amplifies a signal and sends it to the antenna 17 and includes an input distributor 16, a plurality of, that is, m amplification circuits 15-1 to 15-m (m is an integral number equal to or greater than 2) connected in parallel to each other, and a power composer 13.

The input distributor 16 divides a signal into divisional signals and outputs the divisional signals to the amplification circuits 15-1 to 15-m. Each of the amplification circuits 15-j (j =1 to m) amplifies a signal inputted thereto.

The failure supervision means 6 supervises a failed condition of the amplification circuits 15-j of the amplification apparatus 5.

Output carrier number control means 7 controls the number of output carriers of the modulation apparatus 4 based on amplification circuit failure information detected by the failure supervision means 6, and includes failed amplification circuit number detection means 8, upper limit carrier number determination means 9 and modulation circuit stopping instruction means 10.

The failed amplification circuit number detection means 8 detects the number of failed amplification circuits.

The upper limit carrier number determination means 9 determines the upper limit number of carriers from the number of failed amplification circuits detected by the failed amplification circuit number detection means 8. Here, the upper limit number of carriers determined by the upper limit carrier number determination means 9 depends upon three-dimensional intermodulation distortion information. It is to be noted that the upper limit carrier number determination means 9 may include storage means 11 for storing a carrier number—three-dimensional intermodulation distortion information characteristic.

The modulation circuit stopping instruction means 10 outputs a stopping instruction to a required number of modulation circuits so that the number of operative modulation circuits may not exceed an upper limit carrier number determined by the upper limit carrier number determination means 9.

It is to be noted that the output carrier number control means 7 may be provided in the exchange 1 or alternatively in the radio base station 3. In the latter case, output carrier number control information from the output carrier number control means 7 is transmitted to the exchange 1, in which the output carrier number control information is managed.

In the mobile communication system of the present invention described above, the radio base station 3 is connected to the exchange 1 and establishes a communication interface with the mobile terminal 2. The modulation apparatus 4 in the radio base station 3 modulates a signal and sends the thus modulated signal to the amplification apparatus 5. In this instance, the modulation circuits 14-1 to 14-n in the modulation apparatus 4 outputs carriers different from one another. The power composer 13a composes the signals from the modulation circuits 14-1 to 14-n and sends out the thus composed signal to the amplification apparatus 5. Then, the signal is amplified by the amplification apparatus 5 and sent out to the antenna 17.

In this instance, in the amplification apparatus 5, the signal is divided into divisional signals by the input distributor 16, and the divisional signals from the input distributor 16 are amplified by the amplification circuits 5-1 to 15-m connected in parallel to each other to the input distributor 16 and then composed into a single signal by the power composer 13.

The failure supervision means 6 supervises a failed condition of each of the amplification circuits 15-j of the amplification apparatus 5. Then, in response to amplification circuit failure information detected by the failure supervision means 6, the output carrier number control means 7 controls the output carrier number of the modulation apparatus 4.

In particular, the failed amplification circuit number is detected by the failed amplification circuit number detection means 8 in the output carrier number control means 7, and the upper limit carrier number determination means 9 determines an upper limit carrier number from the thus detected failed amplification circuit number. It is to be noted that the upper limit carrier number determined by the upper limit carrier number determination means 9 depends upon three-dimensional intermodulation distortion information read out, for example, from the storage means 11 in which the carrier number-three-dimensional intermodulation distortion information characteristic is stored.

Then, the modulation circuit s-topping instruction means 10 outputs a stopping instruction to a required number of ones of the modulation circuits 14-1 to 14-n so that the number of operative ones of the modulation circuits 14-1 to 14-n may not exceed the upper limit carrier number determined by the upper limit carrier number determination means 9.

It is to be noted that, while the output carrier number control means 7 is provided either in the exchange 1 or in the radio base station 3, where it is provided in the radio base station 3, output carrier number control information from the output carrier number control means 7 is transmitted to the exchange 1, in which the output carrier number control information is managed.

Accordingly, with the mobile communication system of the present invention, since a possible increase in three-dimensional intermodulation distortion is eliminated by controlling the number of output carriers of the modulation apparatus to be inputted to the amplification apparatus so that the number may be decreased in response to failure of the amplification circuits 15-j, there is an advantage in that the necessity for the amplification circuits 15-j to have superfluous saturation outputs is eliminated, which contributes very much to reduction of the power consumption.

b. Description of the First Embodiment

Figure 2:
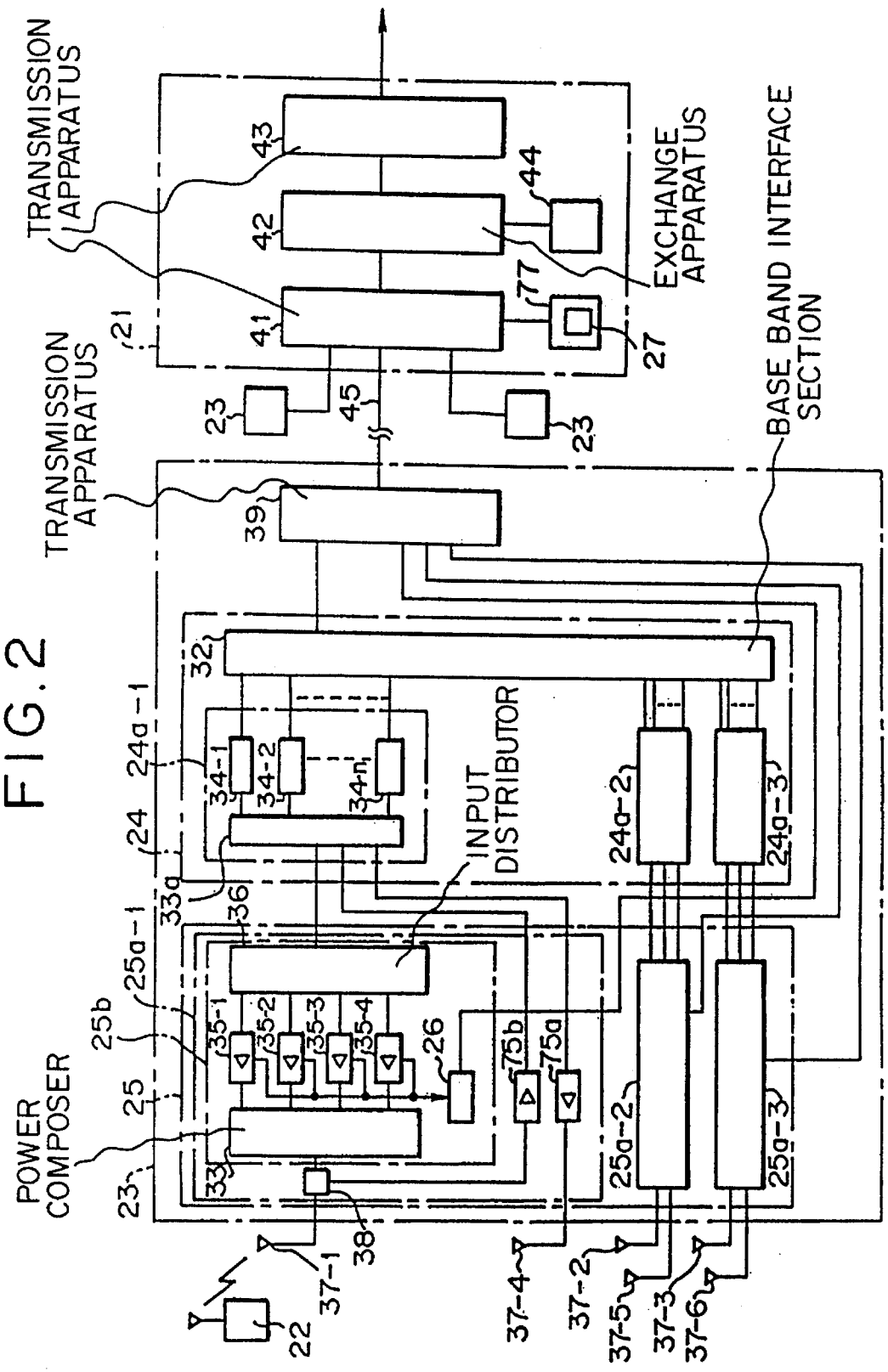
FIG. 2 is a block diagram of another mobile communication system showing a first preferred exemplary embodiment of the present invention.

FIG. 2 shows a mobile communication system according to a first preferred embodiment of the present invention. Referring to FIG. 2, the mobile communication system includes an exchange 21 which accommodates a plurality of radio base stations 23.

A mobile terminal 2g is represented by a car telephone set and is accommodated in one of the radio base stations 23 by way of which optimum communications are available with the mobile terminal 22.

The radio base station 23 establishes a communication interface between the exchange 21 and the mobile terminal 22. In particular, the radio base station 23 has three pairs of transmission antennae 37-1, 37-2 and 37-3 and reception antennae 37-4, 37-5 and 37-6 and performs communications with the mobile terminal 22 in accordance with the space diversity system. The radio base station 23 thus includes a modulation and demodulation apparatus 24, an amplification apparatus 25, and a transmission apparatus 39 having a demultiplexing function.

The modulation and demodulation apparatus 24 modulates and transmits a transmission signal to the amplification apparatus 25 and demodulates a reception signal from the amplification apparatus 25. The modulation and demodulation apparatus 24 includes three modulation and demodulation apparatus 24a-1, 24a-2 and 24a-3 which provide a three-sector configuration, and a base band interface section 32. Each of the modulation and demodulation apparatus 24a-1, 24a-2 and 24a-3 includes a distribution and composition section 33a, and modulation and demodulation circuits 34-1 to 34-n each provided for each one carrier.

The distribution and composition section 33a performs composition of a transmission and distribution of a reception signal, and each of the modulation and demodulation circuits 34-i performs modulation and demodulation of a carrier frequency.

The amplification apparatus 25 amplifies a transmission or reception signal to a signal of a predetermined power and includes three amplification apparatus 25a-1, 25a-2 and 25a-3 for each of the sectors. Each of the amplification apparatus 25a-1, 25a-2 and 25a-3 includes a transmission and reception unit 38, a transmission amplification section 25b and a pair of reception amplification circuits 75a and 75b.

The transmission and reception unit 38 suppresses unnecessary waves of a transmission or reception signal outside a band. The transmission amplification section 25b includes an input distributor 36, four amplification circuits 35-1 to 35-4, a power composer 33 and failure supervision means 26.

The input distributor 36 divides a transmission signal into four divisional signals and sends out the divisional signals to the amplification circuits 35-1 to 35-4. The amplification circuits 35-1 to 35-4 are connected in parallel with each other and each amplifies a transmission signal to a signal of a prescribed power. The power composer 33 composes such divisional signals from the amplification circuits 35-1 to 35-4 back into a transmission signal.

The failure supervision means 26 collects failure information of the amplification circuits 35-1 to 35-4 of the amplification apparatus 25 and is provided in a transmission amplification section 25b for each one sector.

The exchange 21 includes transmission apparatus 41 and 43 each having a multiplexing function and a demultiplexing function, an exchange apparatus 42, an exchange control apparatus 44 and a base station control apparatus 77.

The exchange apparatus 42 performs switching of circuits, and the exchange control apparatus 44 controls the exchange apparatus 42.

The base station control apparatus 77 performs remote control of the components in the radio base station 23. The base station control apparatus 77 includes output carrier number control means 27. The output carrier number control means 27 controls the number of output carriers of the modulation and demodulation apparatus 24 in the radio base station 23 based on amplification circuit failure information collected by the failure supervision means 26.

Figure 3:
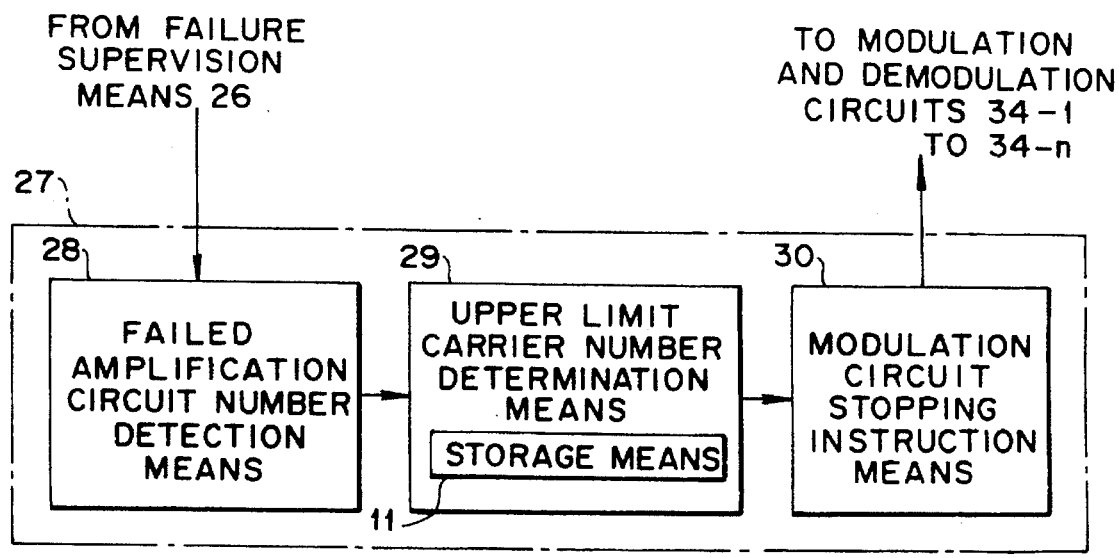
FIG. 3 is a block diagram showing output carrier number control means of the mobile communication system of FIG. 2.

FIG. 3 shows details of the output carrier number control means 27. Referring to FIG. 3, the output carrier number control means 27 includes failed amplification circuit number detection means 28, upper limit carrier number determination means 29 and modulation circuit stopping instruction means 30.

Figure 5:
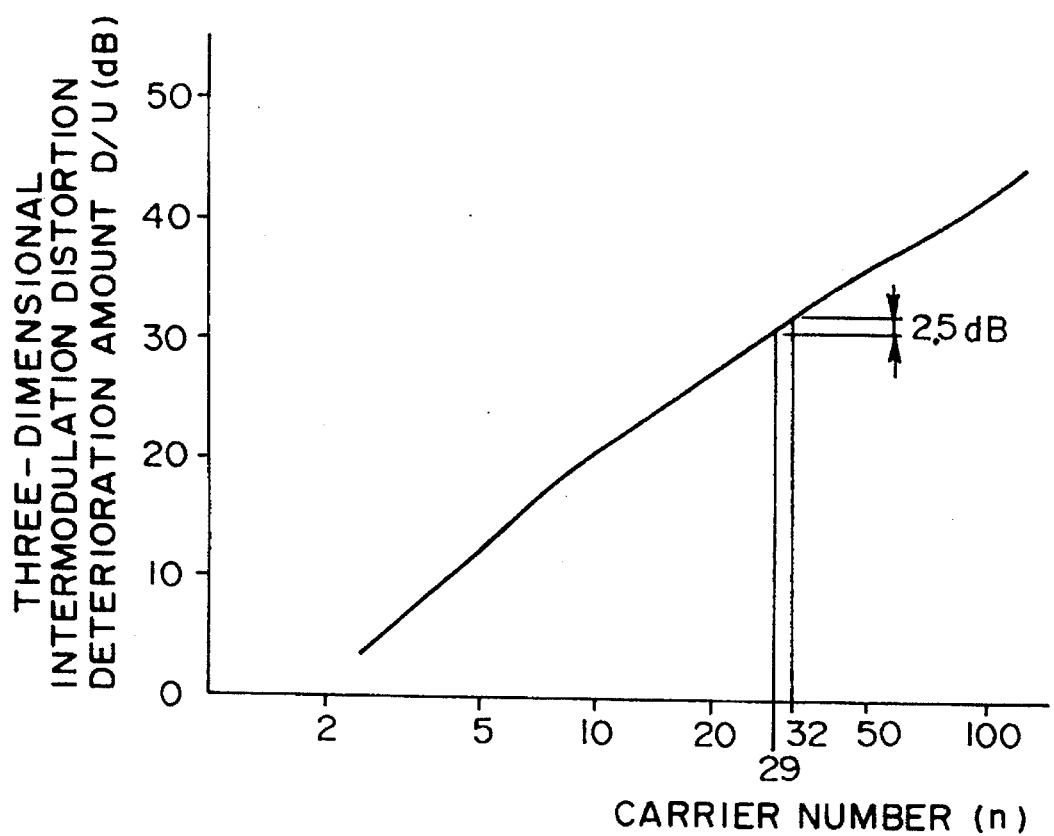
FIG. 5 is a diagram illustrating the carrier number - three-dimensional intermodulation distortion information characteristic of the mobile communication system of FIG. 2.

The failed amplification circuit number detection means 28 detects the number of failed amplification circuits, and the upper limit carrier number determination means 29 determines the upper limit carrier number from the failed amplification circuit number detected by the failed amplification circuit number detection means 28. Further, the upper limit carrier number determination means 29 includes storage means 31 in which a carrier number-three-dimensional intermodulation distortion information characteristic illustrated in FIG. 5 is stored.

The modulation circuit stopping instruction means 30 outputs a stopping instruction to a required number of the modulation circuits so that the number of effective ones of the modulation circuits may not exceed an upper limit carrier number determined by the upper limit carrier number determination means 29.

The exchange 21 and each of the radio base stations 23 are connected to each other by way of a transmission line 45.

Figure 7:
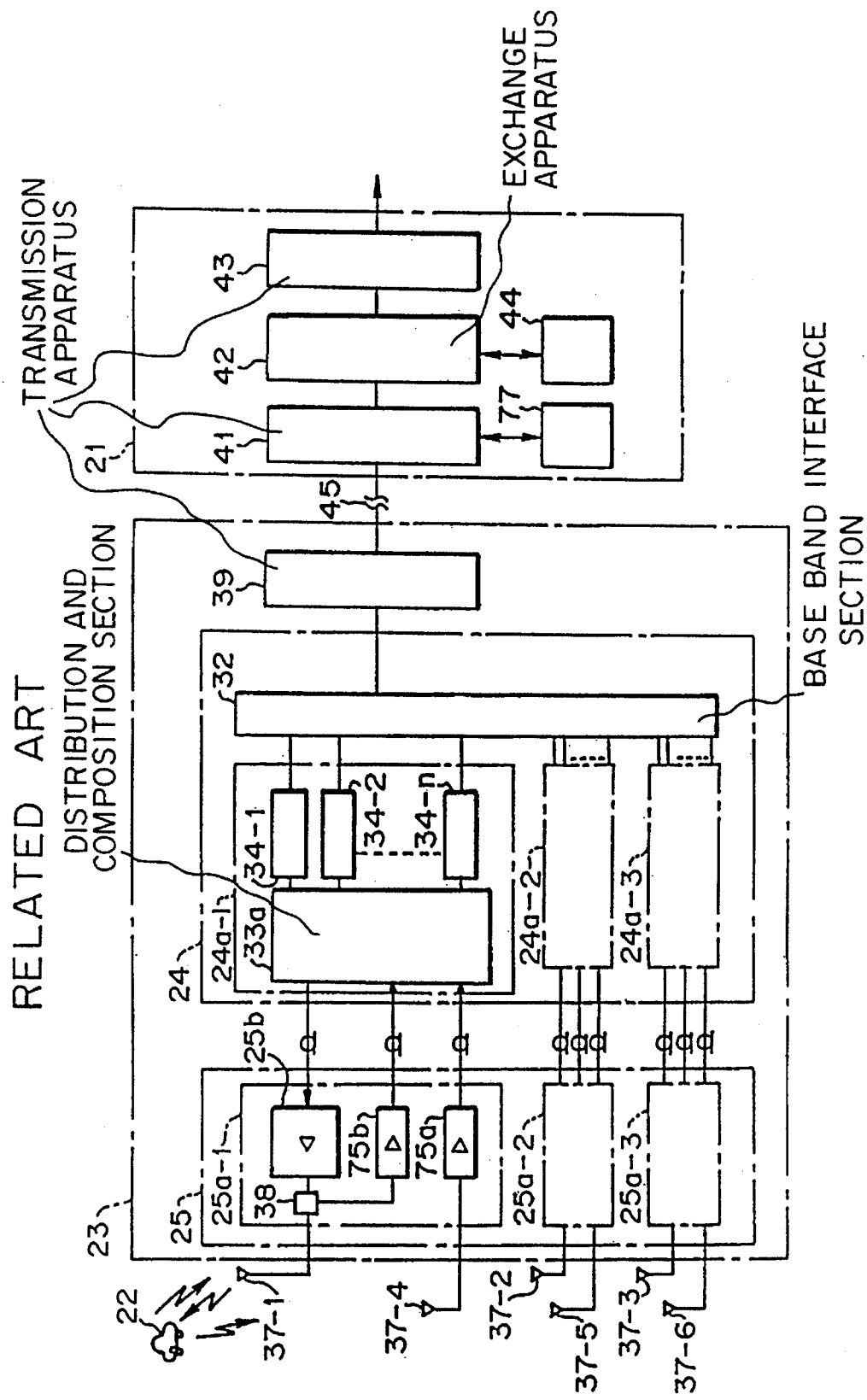
FIG. 7 is a block diagram showing a general construction of a mobile communication system.
Figure 8:
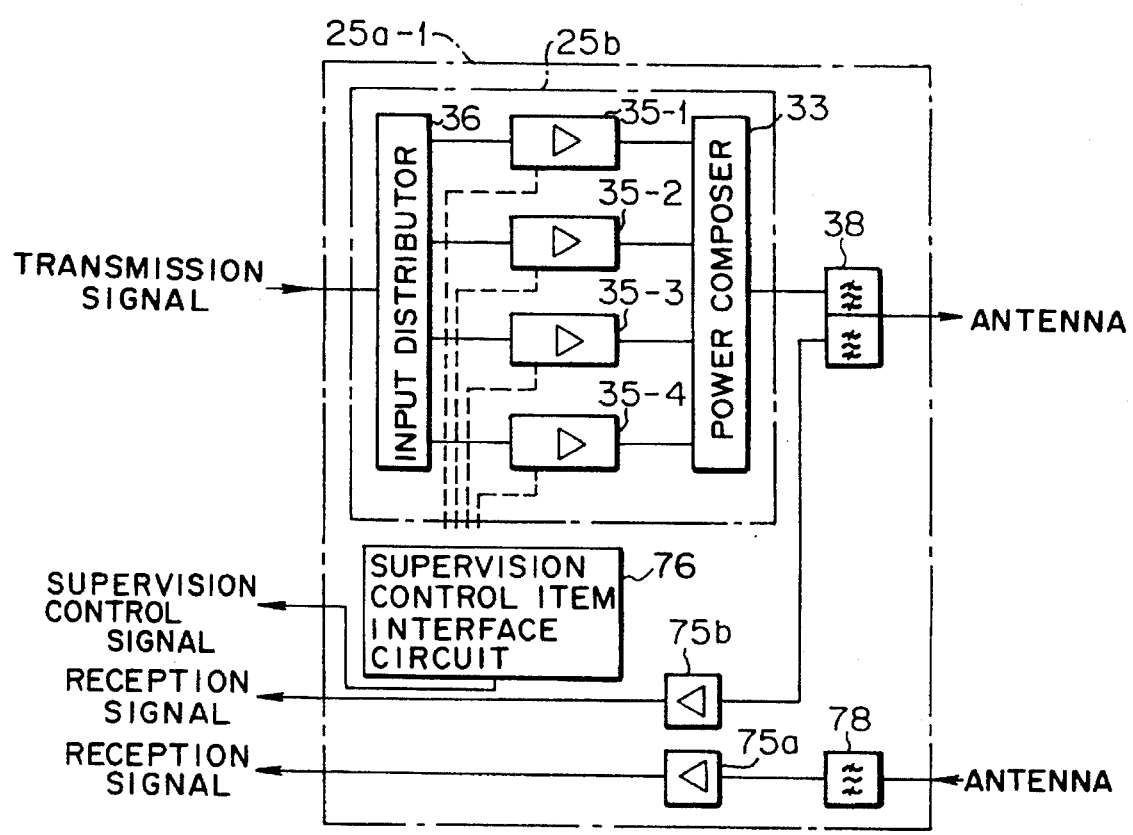
FIG. 8 is a block diagram showing details of an amplification apparatus of the mobile communication system of FIG. 7.
Figure 9:
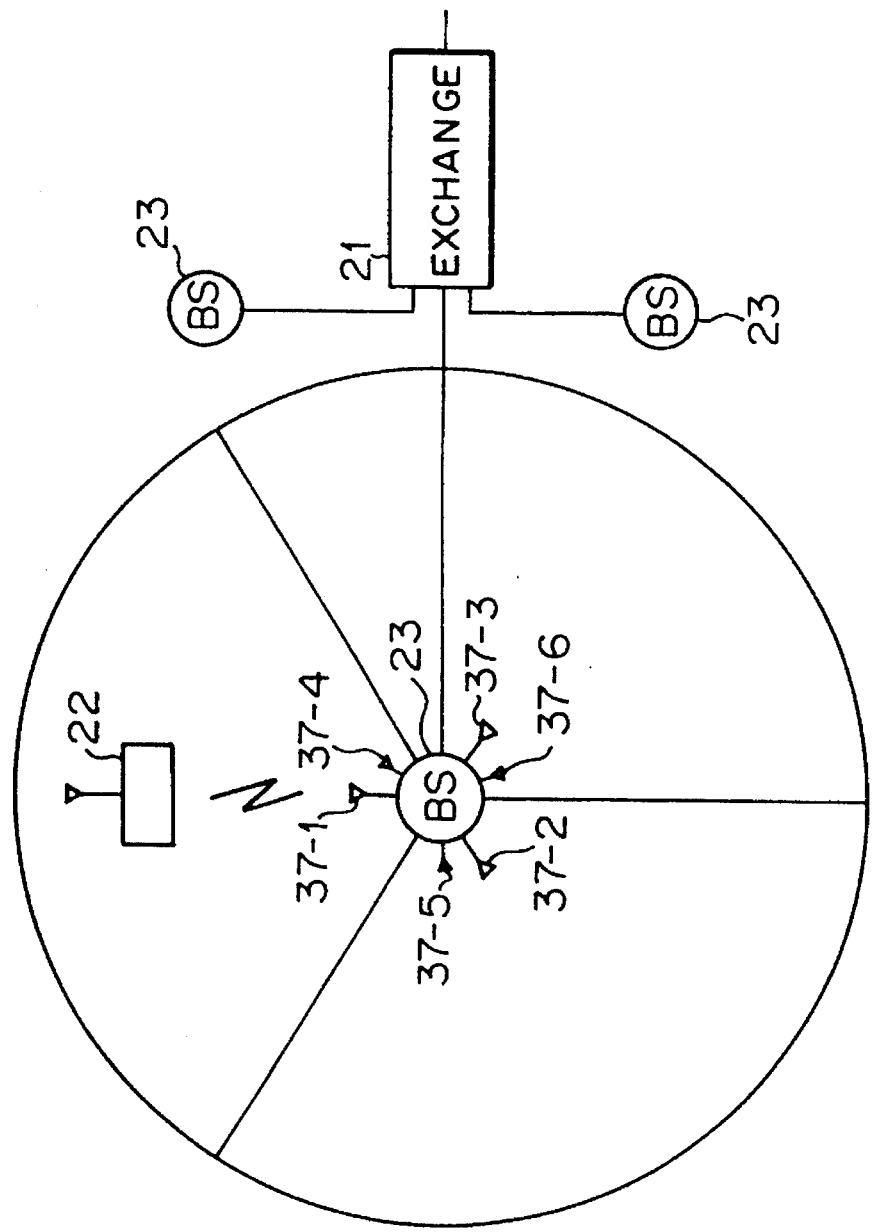
FIG. 9 is a diagrammatic view illustrating communications in the mobile communication system of FIG. 7.

From the description above, it can be understood that the transmission apparatus 41 and 43, the exchange apparatus 42 and the exchange control apparatus 44 in the exchange 21 and the modulation and demodulation apparatus 24, the amplification apparatus 25, the transmission antennae 37-1 to 37-3 and the transmission apparatus 39 in the radio base stations 23 have similar constructions and operate similarly to those of the mobile communication system described hereinabove with reference to FIGS. 7 to 9.

In the mobile communication system of the construction described above, each of the radio base stations 23 is connected to the exchange 21 and establishes a communication interface with a mobile terminal 22. The modulation and demodulation apparatus 24 in the radio base station 23 modulates a signal and sends it to the amplification apparatus 25. In this instance the modulation and demodulation apparatus 24a-1 to 24a-n in the modulation and demodulation apparatus 24 output carries different from one another.

The distribution and composition section 33a composes the signals from the modulation and demodulation apparatus 24a-1 to 24a-n and sends out the thus composed signal to the amplification apparatus 25. The signal is thus amplified by the amplification apparatus 25 and is sent out to the transmission antenna 37-1. In this instance, in the amplification apparatus 25, the signal is divided into divisional signals by the input distributor 36, and the divisional signals are amplified by the amplification circuits 35-1 to 35-4 connected in parallel with each other and then composed into a signal by the power composer 33.

In this instance, the failure supervision means 26 in the radio base station 23 normally supervises a failed condition of the amplification circuits 35-1 to 35-4 of the amplification apparatus 25 and sends out thus collected failure information to the transmission apparatus 39. The failure information is then transferred to the exchange 21 by the transmission apparatus 39 and then inputted to the output carrier number control means 27 by way of the transmission apparatus 41 in the exchange 21.

The output carrier number control means 27 controls the modulation and demodulation apparatus 24 in accordance with the amplification circuit failure information so that the number of output carriers of the modulation and demodulation apparatus 24 may be decreased. In particular, the number of failed amplification circuits is detected by the failed amplification circuit number detection means 28 in the output carrier number control means 27, and the upper limit number of carriers is determined from the failed amplification circuit number by the upper limit carrier number determination means 29. In this instance, the upper limit carrier number determination means 29 retrieves the storage means 31 in response to three-dimensional intermodulation distortion information to determine the upper limit carrier number.

FIG. 5 illustrates the carrier number-three-dimensional intermodulation distortion information characteristic. The following can be recognized from FIG. 5. For example, if it is considered as a worst condition that carriers of an equal power are disposed in an equidistantly spaced relationship from each other, then where the maximum carrier number of the system is 32 and the amplification apparatus 25 includes four parallel amplification circuits and has a saturation output characteristic which is set so as to satisfy the intermodulation standard when the maximum number of carriers are effectively used, when one of the amplification circuits 35-1 to 35-4 fails, the saturation output of the amplification apparatus 25 is deteriorated by 1.25 dB and the three-dimensional intermodulation distortion is deteriorated by 2.5 dB. Accordingly, in order to improve the three-dimensional intermodulation by 2.5 dB, it can be seen from FIG. 5 that the number of carriers should be reduced from 32 to 29.

Further, since the deterioration of the saturation output of the amplification apparatus 25 increases as the number of parallel connected amplification circuits decreases the number of carriers is controlled in response to the deterioration amount of the saturation output. It is to be noted that the carrier number-three-dimensional intermodulation distortion information characteristic is stored in the storage means 31 provided in the upper limit carrier number determination means 29 as described hereinabove.

Thus, the modulation circuit stopping instruction means 30 outputs a stopping instruction to a required number of ones of the modulation and demodulation circuits so that the number of effective ones of the modulation and demodulation circuits may not exceed the upper limit carrier number determined by the upper limit carrier number determination means 29.

In the carrier number-three-dimensional intermodulation distortion information characteristic illustrated in FIG. 5 in order to reduce the number of carriers from 32 to 29, the modulation circuit stopping instruction means 30 will output a stopping instruction to three modulation circuits.

Figure 4:
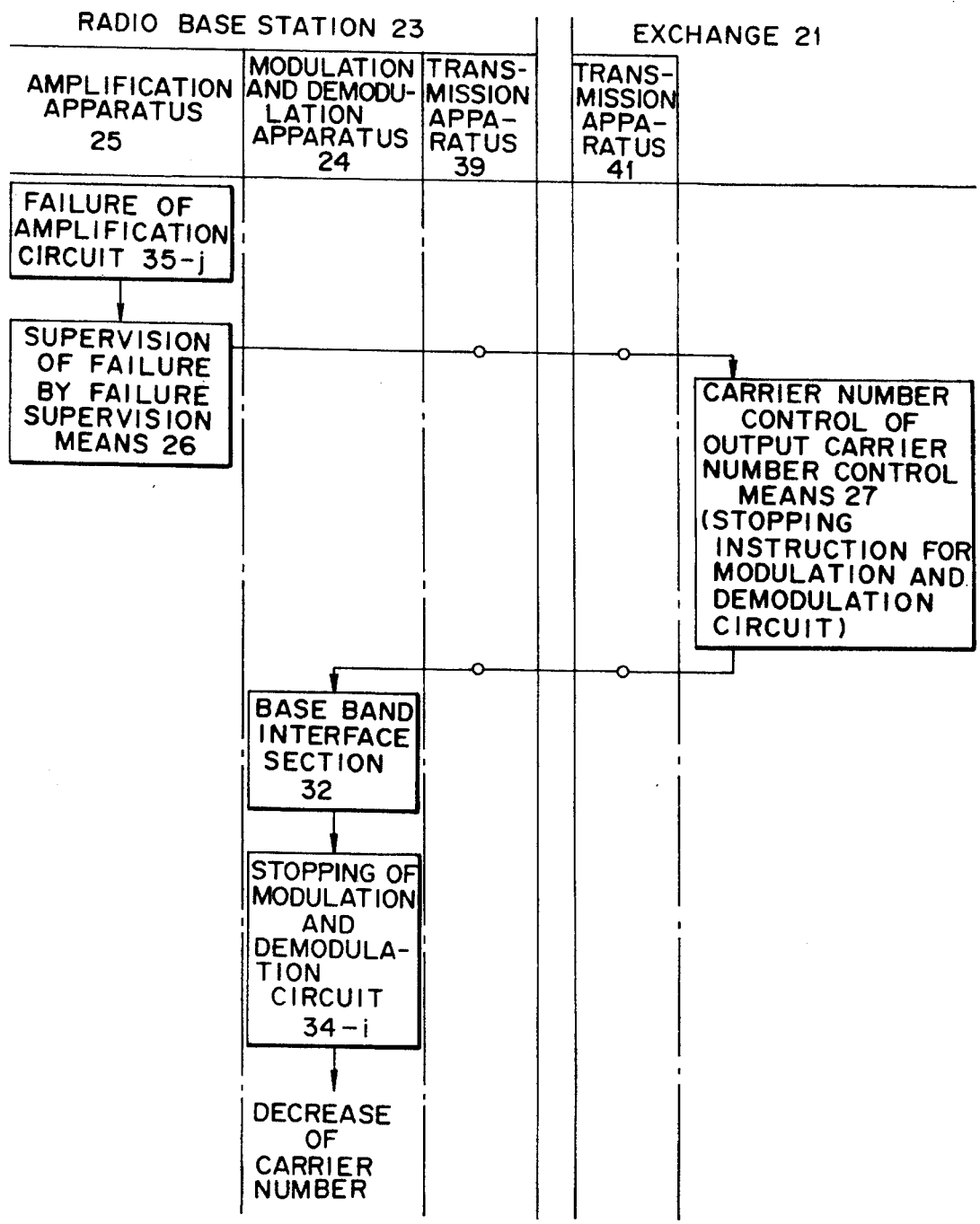
FIG. 4 is a control flow diagram illustrating operation of the mobile communication system of FIG. 2.

An outline of the operations of the mobile communication system described above is illustrated in the control flow diagram of FIG. 4.

As described above, with the mobile communication system of the first embodiment described above, since the deterioration of the three-dimensional intermodulation distortion is eliminated by controlling the number of output carriers of the modulation apparatus to be inputted to the amplification apparatus so as to be decreased in response to failure of the amplification circuits, the necessity for each amplification circuit to have a superfluous saturation output is eliminated, and consequently, the power consumption of the amplification apparatus can be reduced.

Figure 6:
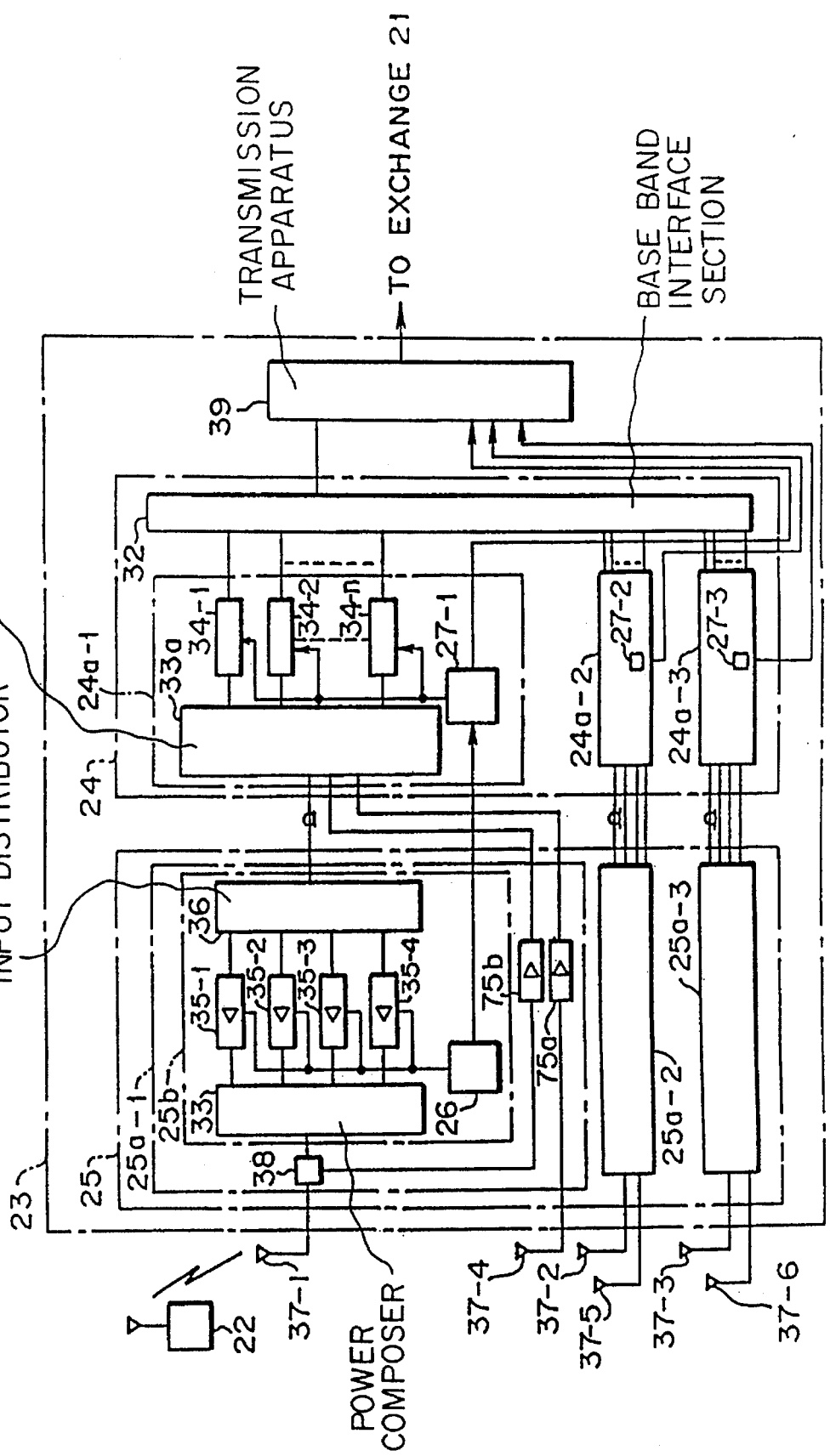
FIG. 6 is a block diagram of a further mobile communication system showing a second preferred embodiment of the present invention.

Further, since the output carrier number control means 27 is provided in the exchange 21, the radio base stations 23 accommodated in the exchange 21 can be supervised and controlled collectively, and effective control of the radio base station 23 can be achieved. c. Description of the Second Embodiment FIG. 6 shows a mobile communication system according to a second preferred embodiment of the present invention. Referring to FIG. 6, the mobile communication system of the present embodiment is a modification to and includes several common elements to those of the mobile communication system of the first embodiment described hereinabove. The common elements are denoted by like reference characters to those of the mobile communication system of FIG. 2, and overlapping description of them is omitted herein to avoid redundancy.

The mobile communication system of the present embodiment is different from the mobile communication system of the first embodiment in that it includes, in place of the output carrier number control means 27 provided in the exchange 21, output carrier number control means 27-1, 27-2 and 27-3 which are provided in the modulation and demodulation apparatus 24a-1, 24a-2 and 24a-3, respectively, for the individual sectors in each radio base station 23, and each controls the number of output carriers of the modulation and demodulation apparatus 24 in response to amplification circuit failure information collected by the failure supervision means 26 and transmits output carrier number control information thus determined to the exchange 21. Each of the output carrier number control means 27-1, 27-2 and 27-3 includes failed amplification circuit number detection means, upper limit carrier number determination means and modulation circuit stopping instruction means and has a similar construction and operates similarly to the output carrier number control means 27 of the mobile communication system of the first embodiment described hereinabove with reference to FIG. 3.

Thus, it can be understood from the description above that the mobile communication system of the present embodiment is characterized in that the output carrier number control means 27-1, 27-2 and 27-3 are provided not in the exchange 21 but in each radio base station 23.

Due to the construction described above, also with the mobile communication system of the present embodiment, each radio base station 23 is connected to the exchange 21 and establishes a communication interface with a mobile terminal 22. In particular, the modulation and demodulation apparatus 24 in the radio base station 23 modulates a signal and sends it to the amplification apparatus 25. In this instance, the modulation and demodulation apparatus 24a-1 to 24a-n in the modulation and demodulation apparatus 24 output different carriers from one another. The distribution and composition section 33a composes the output signals of the modulation and demodulation apparatus 24a-1 to 24a-n into a signal and sends the signal to the amplification apparatus 25. The signal is amplified in the amplification apparatus 25 and sent out to the transmission antenna 37-1. In this instance, in the amplification apparatus 25, the signal inputted thereto is divided into divisional signals by the input distributor 36, and the divisional signals are amplified by the amplification circuits 35-1 to 35-4 connected in parallel with each other and then composed into back a signal by the power composer 33.

In this instance, the failure supervision means 26 normally supervises a failed condition of the amplification circuits 35-1 to 35-4 of the amplification apparatus 25 and inputs the thus collected failure information to the corresponding output carrier number control means 27-1 (one sector) provided in the modulation and demodulation apparatus 24 in the radio base station 23. In response to the thus inputted amplification circuit failure information, the output carrier number control means 27-1 outputs a stopping instruction to a required number of ones of the modulation circuits in the modulation and demodulation apparatus 24 to control the number of output carriers so as to be decreased.

In this instance, the output carrier number control means 27-1 controls the output carrier number in response to three-dimensional intermodulation distortion information similarly as in the mobile communication system of the first embodiment described above. However, the output carrier number control information from the output carrier number control means 27-1 then is transmitted also to the exchange 21 so that the output carrier number control information is managed collectively by the exchange 21.

It is to be noted that similar control is performed also for the other sectors.

As described above, according to the mobile communication system of the present embodiment, since an increase in three-dimensional intermodulation distortion is eliminated by controlling the number of output carriers of the modulation apparatus to be inputted to the amplification apparatus so as to be decreased in response to failure of the amplification circuits similarly as in the mobile communication system of the first embodiment described above, the necessity for each amplification circuit to have a superfluous saturation output is eliminated, and the power dissipation of the amplification apparatus can be decreased. In addition, since the output carrier number control means is provided in each radio base station, the processing from failure of an amplification circuit to control of the output carrier number can be performed in a short period of time.

The present invention is not limited to the specifically described embodiment and variations and modifications may be made without departing from the scope of the present invention.

What is claimed is:

1. A mobile communication system, comprising:

an exchange;

a radio base station connected to said exchange for establishing a communication interface with a mobile terminals, said radio base station including a modulation apparatus including a plurality of modulation circuits for outputting carriers different from each other, an amplification apparatus including a plurality of amplification circuits connected in parallel with each other, and failure supervision means for supervising a failed condition of said amplification circuits of said amplification apparatus; and output carrier number control means for controlling the number of output carriers of said modulation apparatus in response to amplification circuit failure information detected by said failure supervision means, wherein said output carrier number control means includes failed amplification circuit number detection means for detecting the number of failed ones of said amplification circuits, upper limit carrier number determination means for determining the upper limit number of carriers from the failed amplification circuit number detected by said failed amplification circuit number detection means, and modulation circuit stopping instruction means for outputting a stopping instruction to a required number of ones of said modulation circuits so that the number of effective ones of said modulation circuits may not exceed the upper limit carrier number determined by said upper limit carrier number determination means.

2. A mobile communication system as claimed in claim 1, wherein said output carrier number control means is provided in said exchange.

3. A mobile communication system as claimed in claim 1, wherein the upper limit carrier number determined by said upper limit carrier number determination means is determined in response to three-dimensional intermodulation distortion information.

4. A mobile communication system as claimed in claim 3, wherein said upper limit carrier number determination means includes storage means for storing a carrier number-three-dimensional intermodulation distortion information characteristic.

5. A mobile communication system as claimed in claim 1, wherein said output carrier number control means is provided in said radio base station.

6. A mobile communication system as claimed in claim 5, wherein output carrier number control information from said output carrier number control means is transmitted to said exchange, in which the output carrier number control information is managed.

* * * * *